(12) United States Patent
Lessmann et al.

(10) Patent No.: US 8,966,022 B2
(45) Date of Patent: Feb. 24, 2015

(54) PORT-INDEPENDENT TOPOLOGICALLY PLANNED REAL-TIME NETWORK

(75) Inventors: Gunnar Lessmann, Nieheim (DE); Sebastian Schriegel, Steinheim (DE)

(73) Assignee: Phoenix Contact GmbH & Co. KG (DE)

( * ) Notice: Subject to any disclaimer, the term of this patent is extended or adjusted under 35 U.S.C. 154(b) by 513 days.

(21) Appl. No.: 13/356,503

(22) Filed: Jan. 23, 2012

(65) Prior Publication Data

US 2012/0215891 A1  Aug. 23, 2012

(30) Foreign Application Priority Data

Feb. 17, 2011  (DE) .................... 10 2011 011 587

(51) Int. Cl.
*G06F 15/177* (2006.01)
*H04L 12/24* (2006.01)
*H04L 12/28* (2006.01)

(52) U.S. Cl.
CPC .......... *H04L 41/145* (2013.01); *H04L 41/0809* (2013.01)
USPC .......................................... 709/220; 370/254

(58) Field of Classification Search
CPC ... H04L 41/0809; H04L 41/145; H04L 41/12; H04L 41/14; H04L 41/22; H04L 45/02
USPC .............................. 709/220, 249, 250; 370/254
See application file for complete search history.

(56) References Cited

U.S. PATENT DOCUMENTS

| | | | | |
|---|---|---|---|---|
| 7,447,762 B2* | 11/2008 | Curray et al. | ................. | 709/224 |
| 7,701,933 B2* | 4/2010 | Bruckner et al. | ............. | 370/389 |
| 8,072,999 B1* | 12/2011 | Cline et al. | ..................... | 370/431 |
| 2005/0243739 A1* | 11/2005 | Anderson et al. | ............. | 370/254 |
| 2006/0173955 A1* | 8/2006 | Lessman | ........................ | 709/203 |
| 2007/0280134 A1* | 12/2007 | Ramanan et al. | ............. | 370/254 |
| 2008/0288620 A1* | 11/2008 | Goff et al. | ..................... | 709/223 |
| 2010/0182933 A1* | 7/2010 | Hu et al. | ........................ | 370/254 |
| 2010/0306511 A1* | 12/2010 | Mochizuki et al. | ........... | 712/225 |

FOREIGN PATENT DOCUMENTS

| | | |
|---|---|---|
| DE | 10228823 A1 | 6/2002 |
| DE | 69805952 T2 | 1/2003 |
| DE | 102005013303 A1 | 12/2005 |
| DE | 69924950 T2 | 2/2006 |

(Continued)

OTHER PUBLICATIONS

German Office Action, dated Mar. 15, 2011 of German Patent Application No. 10 2011 011 587.0.

(Continued)

*Primary Examiner* — Alina N Boutah
(74) *Attorney, Agent, or Firm* — Kaplan Breyer Schwarz & Ottesen, LLP

(57) ABSTRACT

For an industrial network, for example a PROFInet IRT net for a motion control or in general a network with an isochronous time structure for transmitting time-critical data, it is the object according to the invention to considerably simplify the handling during installation or during maintenance and device replacement. For this purpose, a port-independent, topologically predefined real time network is introduced which provides the compliance with the at least similar safety standard as the PROFInet IRT while dispensing with the (target) specification of a network interface being used. The apparatus according to the invention is illustrated.

18 Claims, 6 Drawing Sheets

(56) References Cited

FOREIGN PATENT DOCUMENTS

| | | | |
|---|---|---|---|
| DE | 69926655 | T2 | 5/2006 |
| DE | 69927252 | T2 | 6/2006 |
| DE | 69927929 | T2 | 7/2006 |
| DE | 602004002352 | T2 | 12/2006 |
| DE | 102006042949 | A1 | 3/2008 |
| EP | 1624614 | A1 | 8/2004 |
| EP | 2159959A1 | A1 | 3/2012 |
| WO | 2006136201 | A1 | 12/2006 |
| WO | 2012052130 | A2 | 4/2012 |

OTHER PUBLICATIONS

European Search Report, dated May 11, 2012 of European Patent Application No. EP12000512.

* cited by examiner

PORT-INDEPENDENT TOPOLOGICALLY PLANNED REAL-TIME NETWORK

CROSS-REFERENCE TO RELATED APPLICATIONS

German patent application DE 10 2011 011 587.0-31, filed Feb. 17, 2011, is incorporated herein by reference.

FIELD OF THE INVENTION

The present invention relates to a port-independent topologically planned real time network (IRTnet—isochronous real time network) which can be used in particular in industrial networks such as PROFINET-IRT (Process Field Network isochronous real time), but also in other networks, preferably in Ethernet-based communication or data transmission networks, in particular in the field of (process) automation technology (so-called Industrial Ethernet).

BACKGROUND OF THE INVENTION

Real-time-capable and real-time-bound and, in particular, clock-synchronous or isochronous communication and data transmission networks require for their installation a complete specification of the network topology. Examples for isochronous networks, thus networks which ensure a real-time-based or real-time-bound and a synchronous or clock-synchronous and therefore deterministic and optionally equidistant communication or data transmission between at least two of their subscribers, are Profinet IRT, SERCOS III, VARAN or EtherCat.

Since in the industrial environment, the network cabling is mostly carried out from machine to machine, these industrial Ethernet networks are in most cases implemented in a line or ring topology.

In order to achieve deterministic communication properties with Ethernet technology, the access to the communication medium is subject to additional rules. There are different approaches. Some standards reserve the medium completely for real time telegrams, others reserve periods of time for real time telegrams. For such a timing of the media access, but also for purposes of topological address allocation, knowledge of the exact network topology is a requirement.

Accordingly, the operation of a topologically planned RealTime Ethernet (RTE) network requires to plan exactly in advance to which unit of the topologically planned RTE network which unit adjacent to said first unit is connected to which predetermined Ethernet interface (so-called "port") of said first unit. Moreover, the line length of the connection between two units is often predetermined.

Exact planning in advance relates at least to the logical configuration of the network, in particular regarding the sequence of the data to be transmitted, and also to the physical configuration, in particular regarding the data transmission paths, for optimizing the data transmission in dependence on the topology of the network.

A clock-synchronous or isochronous communication or data transmission by means of topologically planned real time Ethernet networks is in particular required for controlling motions in drive systems (motion control), thus for a motor control, or during positioning processes.

Within the context of this application, communication and data transmission networks, thus such network systems which allow data exchange and therefore communication between subscribers connected by or via said network systems, are simply designated as networks. The mentioned subscribers are in particular computers, programmable logic controllers or other machines or devices, in particular from the field of (process) automation technology such as sensors or actuators which communicate with one another via the network or exchange data between one another and, in particular, also process data.

The control program is preferably structured in a modular manner and preferably comprises for each equipment type and each embodiment of the plant or the device list corresponding program sections for controlling the same, wherein a respective program section can comprise one or a plurality of functional blocks. When executing the control program by the control unit, those program sections are executed which are required for controlling the devices or subscribers actually situated in the plant and thus are connected to the network and to the control unit.

Designated as IO configuration is the definition of the composition of the process data and IO data in a data telegram, in particular in respect of their structure, volume and sequence.

The definition of a topology of the network, that is, the network subscribers and the connections between them or their network interfaces, is part of the physical configuration.

Furthermore, based on at least some information for an RTE network resulting from the logical and physical configuration, RTE communication parameters for the network are additionally calculated through an RTE planning algorithm, said parameters defining in particular transmitting and receiving times, thus times at which a data telegram is to be transmitted from a first to another network subscriber.

For planning or projecting the logical and physical configuration of a real-time-capable and isochronous network within the planning and implementation of the network and for the start-up of the same, for example after a new construction or reconstruction of a (process) automation plant, it is known that a person familiar with the project planning of such networks or plants uses a so-called engineering system. Such an engineering system is usually formed by an engineering tool which is implemented in a data processing unit, and in the context of which it is also possible to run an RTE planning algorithm for calculating RTE communication parameters for the RTE network. For completion of this planning step, the RTE communication parameters are calculated with the RTE planning algorithm. Subsequently, the engineering system, which is at least temporarily connected to the network for this purpose, transmits the following information to the control unit: a scheduler or a control program, a device list, an IO allocation, an IO configuration, a target topology as specification for setting up the network with its subscribers and the connections, as well as the further RTE communication parameters. In general, such engineering systems are known and available for a multiplicity of network types, in particular Ethernet-based networks.

From this information available to the control unit, in particular from the target topology and the RTE communication parameters, those portions are transmitted to each subscriber which are relevant for the respective subscriber. The subscribers of the network then check automatically if their direct neighbor subscribers correspond to the planned subscribers and network interfaces according to the target topology. If each subscriber has identified the respective correspondency, the target topology can be activated as actual topology and the network with its subscribers or the plant with its devices can be put in operation. However, in the case that one of the subscribers, during the check of its neighbors, identifies deviations of the actual state from the target topology, the subscriber in the known prior art transmits a diagnosis alarm to the control unit which disables the startup of the network until the cause is corrected.

FIG. 1 schematically shows this known solution, the physical configuration being represented by the target topology and the logical configuration being represented by the IO allocation, the latter being illustrated by means of arrows between the device list and the control program.

A disadvantage of this solution according to the prior art, illustrated in FIG. 1, is that the control program is configured such that individual devices, thus plant or machine parts and functions, are mapped by corresponding program modules so that a plurality of variants of a plant or machine can be controlled by the control program, but that with each change of the actual topology or the actual state of the network, for example due to converting the plant, removing and/or adding devices, especially the target topology has to be adapted accordingly by means of the engineering system and, together with the RTE communication parameters recalculated based on said adaptation, has to be transmitted again to the control unit from where the subscribers involved as well as their neighbor subscribers receive the respective portions of the new information, in particular of the target topology and the RTE parameters, before the network or the plant in the changed state can be put in operation again.

According to a further known solution for projecting or planning a real-time-capable and isochronous network, it is envisaged to provide in the control unit a plurality of alternative configurations and in particular the respective target topologies and optionally the associated RTE parameters according to the possible variants of a plant or machine, so that these alternative configurations, without needing an engineering system again, can simply be selected according to the respective actual topology or the respective actual state of the network of a certain variant of the plant, for example via a man-machine interface allocated to the control unit, in particular via a simple display and operating unit connected to the control unit.

However, one problem of this solution is that for machines comprising many variants, for example, in the case of modular machine tool designs where the number of machine variants is almost unlimited, it is no longer feasible to provide in advance the necessary configuration inclusive the target topology and the RTE communication parameters for each possible variant in the control unit.

Another known solution according to the German patent application DE 102006042949.4 is based on the actual topology of the network and quasi dispenses with the specification of a target topology. A so-called topology server in a communication network with further main subscribers is programmed here in such a manner that it checks if a network-internal event has occurred and, in the event of the occurrence of the network-internal event, automatically determines the current actual topology, and, based on communication relations allocated to the main subscribers, automatically determines topology-dependent communication data and automatically transmits to each main subscriber that portion of the topology-dependent communication data that is relevant for the respective main subscriber.

This solution offers a higher flexibility with respect to the previously described approach. However, a disadvantage is the safety risk resulting from the abandonment of a target topology that is independent of the actual topology or actual state of the network. Without the possibility of a target/actual-comparison, errors such as, for example, wrong wirings or the absence of at least one device which, according to a certain variant of the machine or plant would be provided, cannot be reliably detected. Furthermore, according to this solution it is provided that an operator can trigger the automatic configuration process from the outside; however, there is no other possibility for influencing the configuration.

Thus, although solutions are known which at least to some extend allow a dynamic adaptation of the physical configuration to changed network topologies, no dynamic adaptation of the logical configuration to changes with regards to the IO allocations and/or IO configurations is known. Rather, IO allocations and/or IO configurations are always fixedly predefined by means of an engineering system and, in the case of an adaptation, usually require again the aid of the engineering system. This is impractical if, for example, a device of a plant or machine has to be replaced due to a defect and the new device offers the same functions as the old device but requires, for example, a different process or IO data wiring and/or a different composition of the process or IO data in a data telegram because it is a different type and/or is made by a different manufacturer than the old device.

Using an engineering system can usually be managed only by adequately specialized personnel and thus can overtax the operator of a plant.

It is common to prepare this planning by means of software-based tools which, e.g., allow a graphic illustration and editing of the network topology. FIG. 4 shows such an exemplary topology.

The networking of the topology that has to be completely defined in advance entails restrictions. A PROFINET system ensures, for example, that an RTE system starts only if all installed neighbor devices also correspond to the neighbor devices planned in advance; here, not only the names of the devices, but also the assigned Ethernet interfaces have to be consistent with the planning. The consequence of this is that errors in the installation phase or after a device replacement can result in that a machine or an entire plant is not able to start. This condition can only be resolved by diagnosing the difference between the target and the actual configuration as well as by a correction of the installation. In previous methods, this is checked in that each device receives information about the planned neighbor device including the respective port information. If differences are detected in this connection between the actual configuration and the target configuration planned in advance, a diagnosis is triggered which usually results in a stop of the user program and thus possibly results in a stop of the entire plant.

Exact planning of the target topology via an engineering system requires an accurate determination by the user on how the devices and their Ethernet interfaces are to be installed. In the case of the normal Ethernet, due to the "plug & play" approach which is enabled through a dynamic port addressing, these considerations and also the installation are unusual.

In summary this means that the installation of the PROFINET network has to correspond exactly to the planning. At the same time, the installer also has to meet the specifications exactly regarding the interfaces to be selected.

In practice, this is not always easy to do because due to local conditions it might be necessary during the installation to deviate from the planning. These deviations result in increased expenses during the adaptation of the planning because as a result of this, the interface assignment has to be revised again and the network has to be reconfigured.

Also, when replacing one of the devices, for example due to maintenance work or a defect, it occurs again and again that a wrong selection of the network interface causes a time-consuming trouble shooting. It can in particular happen that an error occurs during a device replacement because the network interface can not be allocated to the previously installed interface. The use of PROFINET IRT in practical tests has demonstrated that mixing up ports is a very common error cause.

SUMMARY OF THE INVENTION

It is therefore an object of the invention to provide a method which is able to solve at least one of the mentioned problems.

An object underlying the present invention is therefore to be able to start the operation for the planning and implementation of a plant as well as for the replacement of a device, despite the safety-relevant specification of the target topology and the target/actual-comparison enabled thereby, even with mixed up or otherwise incorrectly connected network connections between the network subscribers.

When preparing the target structure of the network topology, it is not necessary here to define a certain port and, in particular, when establishing the physical network structure of the Ethernet connections, it is not necessary to use exactly the planned ports of the respective network subscribers. Rather, it is an object of the invention to enable the operation of the network or the plant overall, even when using network interfaces which are not to specification.

Accordingly, the above planning in the engineering system can get by without detailed specification of the network interfaces. This simplifies the planning and the safe operation of the network is still ensured.

This possibility shall in particular be suitable for networks having a real-time-bound and synchronous or isochronous data transmission between the subscribers.

The invention shall in particular make the use of an engineering system for maintaining the operation largely unnecessary.

Furthermore, it shall in particular be possible to perform a target/actual-comparison especially with regard to the network topology.

However, in particular preparing and providing a multiplicity of target topologies shall be avoided so that, for example, mixing up a network interface does not represent a new target topology thereby representing a potential error source.

In particular, a logical configuration and/or a physical configuration of the communication and the network shall be possible.

In particular, this possibility shall be suitable for plants or machines comprising many variants.

According to the invention, each device compares the planned (target) neighbor devices and their (target) Ethernet ports with the installed (actual) neighbor devices and the (actual) Ethernet ports. If the specified (target) neighborhood corresponds to the physical (actual) neighborhood, the port information from the planned target configuration is applied to the physical ports.

Through a target specification, thus a planning in advance, for at least the neighborhood of the at least two network subscribers, it is possible to ensure a communication planning. Through the communication planning, which can be determined in advance, the path of a transmission through the network is determined on the basis of the devices. A communication planning on the basis of the Ethernet ports is no longer necessary, which allows a more flexible mounting of the network lines with consistent ensurance of a minimum safety.

The network connection is enabled if the check of the physical actual configuration of the port connection on the basis of the target configuration shows a correspondency of the neighborhood. The RTE network starts operating after performing the target/actual-comparison, thereby enabling the network connections. The application of the communication parameters specified by means of the communication planning to the at least one port of a device is determined through the check of the configuration. This means, only if the check of the physical actual configuration of the port connection on the basis of the network topology shows a correspondency of the neighborhood, the communication parameters are applied to the at least one network interface of the at least one device. This activates, depending on the selection of the communication parameters, the port and/or the connection.

This improvement can be accomplished by implementations in the devices themselves. Neither the PROFINET standard, if used, has to be expanded nor is it necessary to change engineering systems. In the case of networks planned according to the prior art, it is hereby possible to significantly simplify and improve the handling during the installation or during maintenance and device replacement without the need to completely restructure the respective network.

When planning the target topology, it is further possible for a new or even existing network to dispense with actual port information. It is merely necessary to plan in advance which devices are to be connected to which neighbor devices. The connection between the devices can also be provided with attributes such as line length or number of connections (in the example, between "C" and "D"). This allows a simplification of the engineering process for the user, but also for the producers of engineering tools.

In response to at least one configuration-relevant information given by an operator, the apparatus generates a set of configuration data required for configuring at least the at least one further subscriber and transmits at least a subset of this generated set of configuration data via the network to the at least one further subscriber.

For programming the apparatus, an engineering system or a comparable system is substantially necessary only once. After this, a subscriber which is connected to the network and via the same to the apparatus, can be configured according to a target state with regard to the data exchange via the network without further aid of an engineering system, the operator being integrated in the configuration process due to the necessary provision of at least one configuration-relevant information. It is further advantageous that the operator does not have to be trained for handling a usually very complex engineering system in order to be able to configure a network subscriber with respect to the data exchange via the network.

Expediently, the at least one configuration-relevant information can be provided by the operator by means of a man-machine interface preferably allocated to the apparatus, in particular by means of an operating unit having input and output means that is connected to the apparatus.

Preferably, the apparatus is programmed to configure at least the at least one further subscriber with regard to logical and/or physical aspects of the data exchange via the network.

Logical aspects are, for example, as already mentioned above, the IO data to be transmitted or received, the IO allocation, and the IO configuration. Physical aspects relate in particular, as likewise already mentioned, to the topology of the network.

Thus, on the one hand, the apparatus and the method are usable and applicable, respectively, for the configuration of subscribers in networks such as PROFINET IRT which require a physical configuration.

As will be set forth in more detail in connection with the description of the figures, the logical configuration without the aid of an engineering system enabled by the present invention is in particular of advantage if, for example, a device of a plant or machine is to be replaced and the new device has the same functions as the old device but, for example, requires a different process or IO data wiring and/or a different composition of the process or IO data in a data telegram because it is a different type and/or made by a different manufacturer than the old device. This can affect in particular also the configuration of the network interface.

It is to be mentioned here that the apparatus and the method can also be implemented in such a manner that only the logical or only the physical configuration is carried out by means of the apparatus, while the in each case other configuration, if required by the network present in each case, is still carried out by means of an engineering system.

Particularly preferred, the set of generated configuration data required for configuring the at least one further subscriber with regard to physical aspects comprises a target topology for the network.

The target topology is generated here by the apparatus with regard to the set of information which is provided by the user and, for example, is configuration-relevant for the in each case present variant of a modularly structured plant or machine. Thus, on the one hand, it is not required to provide a plurality of target topologies for a plurality of possible variants from which the in each case suitable variant is to be selected. On the other hand, however, an actual target topology is still given as a target specification which allows an actual target/actual-comparison and thus in particular the detection of errors such as, for example, wrong wiring or the absence of a device which would be provided according to a certain variant of the machine or the plant, and thus ensures the safety.

Depending on the type or specification of the network and its further subscribers, the apparatus expediently comprises means for a data exchange which are designed for a cyclical, real-time-bound and/or clock-synchronous data exchange via the network. The apparatus which preferably comprises means for a real-time-bound data exchange is particularly preferred programmed to configure the at least one further subscriber with regard to a real-time-bound data exchange via the network. Alternatively or additionally, the apparatus, which preferably comprises means for a clock-synchronous data exchange, is particularly preferred programmed so as to configure the at least one further subscriber with regard to a clock-synchronous data exchange via the network.

Preferably, the apparatus comprises means for data exchange for a data exchange via the network, said means being designed according to the PROFINET IRT specification. Particularly preferred, the set of configuration data generated and required for configuring the at least one further subscriber comprises a set of RTE-specific parameters calculated by the apparatus. Therefore, the apparatus is advantageously designed so as to calculate also the RTE communication parameters required for the configuration, for example, of a PROFINET IRT network, so that neither a plurality of parameter sets for a plurality of possible variants of a modularly structured plant or machine is to be provided and from which sets then in each case the suitable set is to be selected, nor is an engineering system necessary for recalculating said parameters.

According to a particularly preferred embodiment variant, the apparatus reads out a set of configuration-relevant information from the net and/or the at least one further subscriber and, based thereon, generates the set of configuration data required for configuring the at least one further network subscriber and, in response to at least one configuration-relevant information, in particular a release of the generated set of configuration data, provided by the operator, transmits via the network at least on subset of this generated set of configuration data to the at least one further subscriber.

According to a preferred embodiment variant, the apparatus first checks the set of configuration data generated and required for configuring the at least one further subscriber for plausibility in itself before the apparatus transmits via the network at least a subset of said generated set of configuration data to the at least one further subscriber.

According to a particularly preferred embodiment variant, the apparatus first checks the set of configuration data generated and required for configuring the at least one further subscriber for plausibility with regard to the actual state of the network and at least of the at least one further subscriber before the apparatus transmits via the network at least a subset of said generated set of configuration data to the at least one further subscriber.

Preferably, the apparatus is programmed so as to configure itself with regard to the data exchange via the network by means of at least one subset of the generated set of configuration data.

According to a particularly preferred embodiment variant, the apparatus is programmed in such a manner that after configuring, said apparatus controls the at least one further subscriber, the apparatus being in particular a programmable logic controller. Thus, it is preferred according to the invention that a programmable logic controller is programmed such that it not only controls the subscribers of a network, which are in particular devices of a plant or machine, but is also able to configure said subscribers, prior to the operating phase, with regard to the data exchange via the network, and thus, apart from the program code of a control program, also executes the program code of a configuration program for this purpose.

The present invention further provides a data processing and transmission system, comprising an apparatus according to one of the above-described embodiments and at least one further subscriber which are connected to each other via a network and can exchange data with each other.

The present invention further provides a data carrier with a program code stored thereon, the program code being formed such that an apparatus according to one of the above-described embodiments is formed when it is programmed with said program code.

The invention is explained below in more detail by means of exemplary embodiments and with reference to the figures, wherein identical and similar elements are indicated in some cases with identical reference numbers, and the features of the different exemplary embodiments can be combined with each other.

BRIEF DESCRIPTION OF THE FIGURES

In the figures

FIGS. 2b and 2c show a schematic illustration of an example for the (FIG. 2c) based on a first basic variant of the plant (FIG. 2b), using the embodiment variant of the invention according to FIG. 2a;

DETAILED DESCRIPTION OF THE INVENTION

Figure 1:
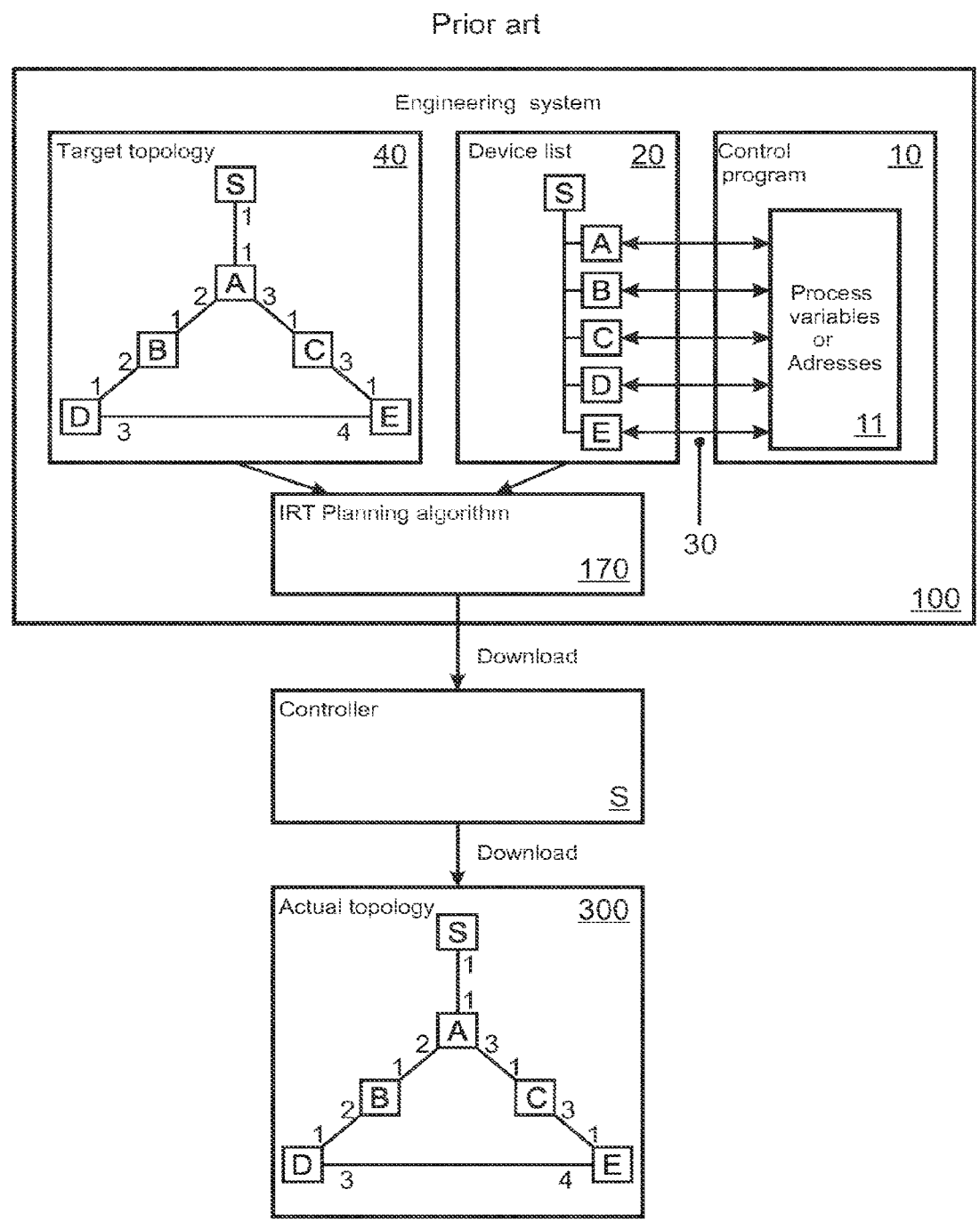
FIG. 1 shows a schematic illustration of a solution known from the prior art for configuring subscribers of a network.

FIG. 1 shows a schematic illustration of a solution known from the prior art for configuring subscribers of a network as they have already been substantially described above.

For the logical and physical configuration of the devices A, B, C, D and E and the controller S which belong to a certain variant of an industrial plant, which is not shown in detail in FIG. 1, and which are at the same time subscribers of a network via which they are connected according to an actual topology 300 and shall be able to transmit or exchange data between each other, the solution represented according to FIG. 1 and already known from the prior art always requires an engineering system 100 which usually is formed by an engineering tool implemented on a data processing unit, usually on a PC or a workstation.

The actual topology 300 is arranged such that initially the control S is connected via its network interface 1 to the network interface 1 of the device A. Besides the network interface 1, the device A has two more network interfaces, hereinafter also designated as ports, wherein it is connected via the port 2 to the port 1 of the device B and via the port 3 to the port 1 of the device C. The device B is connected via its further port 2 to the port 1 of the device D, and the device C has a connection via its further port 3 to the port 1 of the device E. In addition, there is also a connection between the port 3 of the device D and the port 4 of the device E.

Within the planning or projecting of a plant having at least one controller S and a number of devices A to E which, as subscribers of a network, are in communication per data exchange, the engineering system 100 is used for a plurality of subtasks. In general, such engineering systems are known and available for a variety of different network types.

On the one hand, the engineering system serves for designing a scheduler or a control program 10 by means of which a control unit such as the controller S can be programmed so as to control devices such as the devices A to E, which are in particular sensors or actuators, during the operation of the plant. For this, the control program 10 comprises a corresponding program code for at least each of the devices A to E. On the other hand, by means of the engineering system 100, a subscriber or device list 20 is prepared which contains in particular data sets for the control S and the devices A to E, each device data set comprising a set of information which describes the device in detail. It is to be mentioned that although the device list in FIG. 1 is illustrated hierarchically in such a manner that the devices A to E are subordinated to the controller S, this is at least not to be understood as a topology.

The logical and physical configuration of the network subscribers S and A to E with regard to a data exchange via the network, which is implemented in this case as PROFINET IRT, takes place by means of the engineering system 100 and by including the device list 20 as well as the control program 10 so that the communication between the network subscribers takes place or shall take place in a cyclical, real-time-bound and clock-synchronous manner.

The logical configuration comprises here, for example, the IO allocation 30 which is illustrated in FIG. 1 by means of the arrows between the device data sets included in the device list 20 and the control program 10. During the IO allocation, which is also designated as mapping, individual process variables or addresses 11 of the control program 10 are allocated to the process or IO data objects of at least the devices A to E defined in the respective device data sets of the device list 20. To the logical configuration usually also belongs the IO configuration, which is not illustrated in FIG. 1, which relates to the definition of the composition of the process or IO data of the individual subscribers in a data telegram with regard to their structure, volume and sequence.

The physical configuration is represented in FIG. 1 by the target topology 40 by means of which the communication connections between the network subscribers, thus the devices A to E and the control S, are projected. For this, the information and designations included in the device data sets of the device list 20 regarding the individual devices A to E and the control S and especially their network interfaces are used.

It should principally be mentioned again that planning the logical configuration can take place substantially independent of the physical configuration, in particular independent of the topology. Furthermore, planning the physical configuration, thus in particular the target topology, can take place substantially independent of the logical configuration if at least a device list is available which includes at least the designations of the individual subscribers and their individual ports.

Moreover, the engineering system 100 according to FIG. 1 also comprises an RTE planning algorithm 170 for calculating RTE communication parameters for the PROFINET IRT-based network which define, for example, transmitting and receiving times, thus times at which a data telegram is to be transmitted from one to another subscriber, in particular on the basis of information from the target topology 40 and the subscriber or device list 20 as well as the IO configuration.

Following the planning of the logical and physical configuration by means of the engineering system 100, all configuration data including the device list 20 and the control program 10 are transmitted to the controller S (in the figure designated as download) to which the engineering system 100 is at least temporarily connected.

From this configuration data that is now available on the control unit S, those portions are then transmitted to each additional subscriber of the network, thus to the devices A to E, that are relevant for the respective subscriber. The subscribers of the network then check automatically if their direct neighbor subscribers correspond to planned subscribers and network interfaces according to the target topology.

If each subscriber has identified the respective correspondency, the projected plant with its devices or the network with its subscribers can be activated and put in operation. However, if a subscriber identifies deviations between actual state and target state when checking the neighbors, the subscriber sends a diagnosis alarm to the controller S which then disables a startup of the plant and the network until the error cause is eliminated.

The solution illustrated according to FIG. 1 which is known from the prior art has to be approached in this manner as soon as, for example due to a modification of the layout of the plant according to another variant, changes with respect to the subscribers of the actual topology occur; be it that at least one subscriber is added, or one is removed, or the subscribers are connected in a different way to each other.

The disadvantage of this known solution is obvious and has already been explained above.

For a better understanding, in the following description by means of the FIGS. 2a, 2b and 2c as well as 3a, 3b and 3 of embodiment variants according to the invention, the reference numbers introduced within the context of the above description of an already known solution according to FIG. 1 are maintained, provided that it involves comparable features.

Figure 2A:
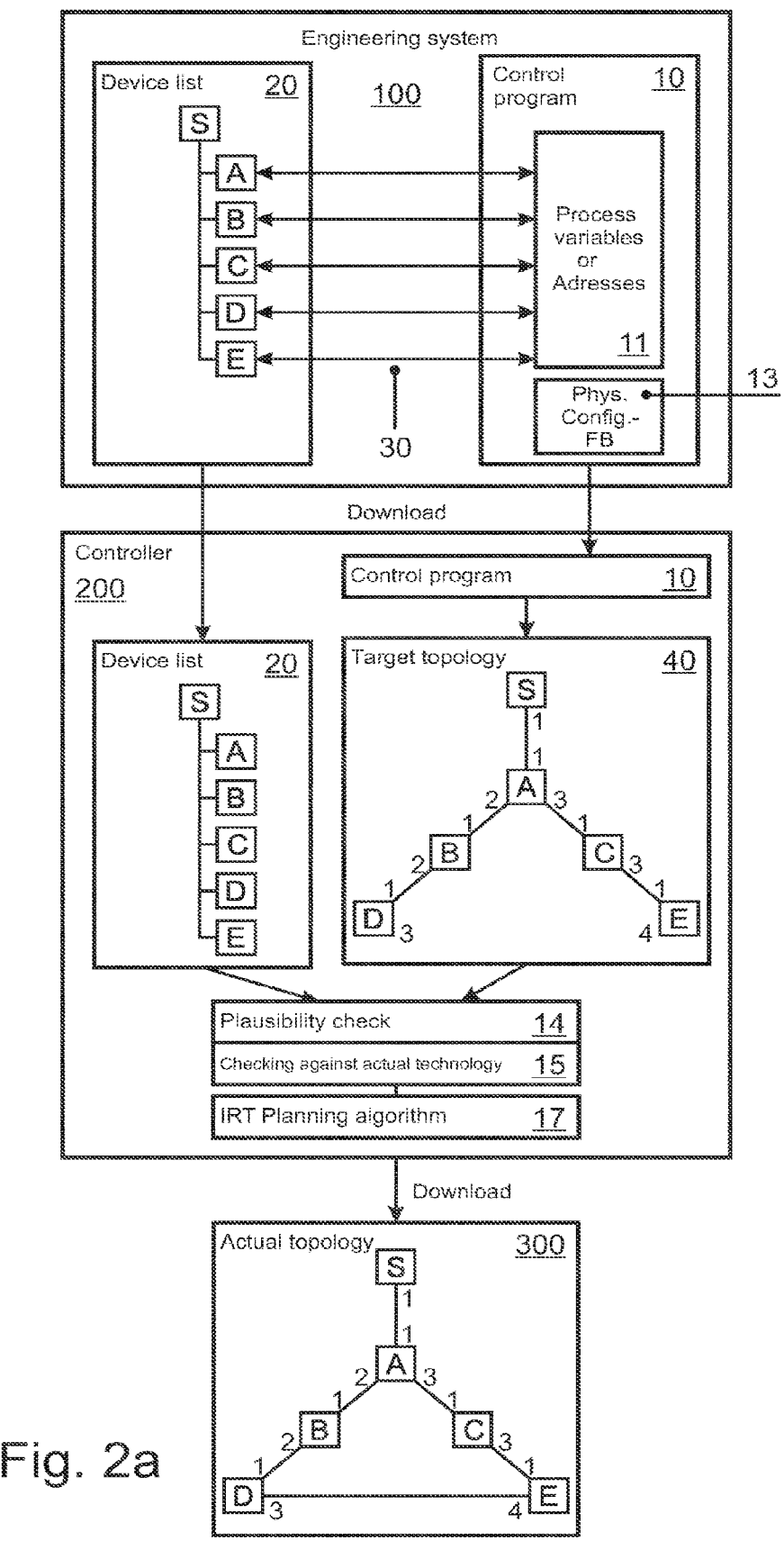
FIG. 2a shows a schematic illustration of an embodiment variant according to the invention for configuring subscribers of a network.

FIG. 2a shows a schematic illustration of an embodiment variant according to the invention for configuring subscribers of a network.

The network subscriber to be configured involve the devices A, B, C, D and E as well as the controller S which belong to a certain variant of an industrial plant, which is not shown in detail in FIG. 2a, and which are connected via a network according to an actual topology 300, via which network said devices and the controller can transmit data or exchange data among each other. The actual topology 300 is arranged such that initially the controller S is connected via its network interface 1 to the network interface 1 of the device A. Besides the network interface 1, the device A has two more network interfaces, in the following also designated as ports, wherein it is connected via the port 2 to the port 1 of the device B and via the port 3 to the port 1 of the device C. The device B is connected via its further port 2 to the port 1 of the device D, and the device C has a connection via its further port 3 to the port 1 of the device E. In addition, there is also a connection between the port 3 of the device D and the port 4 of the device E. Besides the network interfaces or ports shown in FIG. 2a, the control S as well as the devices A to E can in each case have additional ones which, however, are not shown in the figure because, according to the actual topology 300, they do not have a network connection.

Within the planning or projecting of a plant advantageously having at least one controller S and a number of devices which, as subscribers of a network, are in communication per data exchange, an engineering system 100 is also used according to the invention for a plurality of subtasks. However, in the following detailed description of an embodiment variant according to the invention, the differences with respect to the prior art, as set forth in particular by means of FIG. 1, and the resulting advantages are clearly shown.

On the one hand, the engineering system 100 serves for designing a scheduler or a control program 10 by means of which a control unit such as the controller S can be programmed so as to control devices such as the devices A to E, which are in particular sensors or actuators, during the operation of the plant. For this, the control program 10 comprises an adequate program code for at least each of the devices A to E, but in particular also for additional devices which would be used for variants other than the ones according to FIG. 2. On the other hand, by means of the engineering system 100, a subscriber or device list 20 is prepared which contains in particular data sets for the controller S and the devices A to E, but preferably also for additional devices which would be used for other variants of the plant, each device data set comprising a set of information which describes the respective device in detail, in particular a unique device name or another designation that allows a clear identification of the respective device, information about nature, type and manufacturer of the device, a functional description, a definition of the process data of the device, a unique designation of each network interface of the device, and the respective network interface type, for example regarding the required transmission medium (for example copper or glass fiber). But even in this example, the device list does not map a topology.

Furthermore, the logical configuration in particular of the network subscribers S and A to E with regard to a data exchange via the network, which, in this case, is implemented again as PROFINET IRT, takes place by means of the engineering system 100 and by including the device list 20 as well as the control program 10 so that the communication between the network subscribers takes place or shall take place in a cyclical, real-time-bound and clock-synchronous manner.

The logical configuration, for example, comprises again the IO allocation 30 which is illustrated in FIG. 2a by means of the arrows between the device data sets included in the device list 20 and the control program 10, and the IO configuration which is not illustrated in FIG. 2a.

The physical configuration of the embodiment variant according to the invention illustrated in FIG. 2a, however, is no longer carried out by means of the engineering system 100. According to the invention, it is instead provided to design or prepare a configuration program, preferably by means of the engineering system 100, that comprises a program code with which an apparatus 200 can be programmed so as to configure network subscribers such as the devices A to E with regard to the data exchange via the network and, in response to at least one configuration-relevant information provided by an operator, to generate a set of required configuration data and to transmit at least a subset of the generated configuration data via the network to a subscriber to be configured, wherein for the configuration with regard to physical aspects, the set of configuration data generated by the apparatus 200 advantageously comprises a target topology.

As shown in FIG. 2a, the apparatus 200 in this example is a controller so that here the apparatus 200 is at the same time also the controller S. For this reason, the control program 10 prepared by means of the engineering system 100 also comprises, besides a set of program codes for controlling the devices with corresponding process variables and/or addresses 11, an additional program section 13 which, preferably by integrating at least one functional building block, contains program codes for the physical configuration of devices or network subscribers. Such functional building blocks or similar or other mechanisms can also be integrated in an independent configuration program, especially if the apparatus 200 is implemented separately from the control S, which, according to the invention, can also be provided for specific applications.

Functional building blocks for adding and connecting subscribers based on their unique device and port designation for generating a target topology look, for example, like the following:

FB_AddDevice(IN: DeviceID)
FB_AddConnecton(IN: DeviceID, PortID, PartnerDeviceID, PartnerPortID) return ErrorCode According to the invention, in this embodiment variant, the transmission of the configuration data, including the device list 20 and the control program 10 together with the program section 13, can already take place (in the figure designated as download) to the apparatus 200, which in this case is, at the same time, the controller S, wherein the engineering system 100 is at least temporarily connected to the apparatus 200.

Thus, it is preferably provided according to the invention that a programmable logic controller is programmed such that that it not only controls the subscribers of a network, which are in particular devices of a plant or a machine, but is also able to configure said subscribers, prior to the operating phase, with regard to the data exchange via the network, and thus, apart from the program code of a control program, also executes for this purpose the program code of a configuration program.

When executing the control program, preferably, first the program section 13 and thus the program code for configuring the network subscribers is executed. Through an operating unit, which is not illustrated in the figure, an operator has now the possibility to indicate configuration-relevant information in a simple manner and, with a view to the desired network topology, can in particular indicate which device is interconnected via which port with another device. In doing so, the operator can access the information from the data sets of the device list 20, and therefore preferably only needs to select the adequate devices and network interfaces.

In response to this information, the apparatus 200 or the controller S, in addition to the information which has already been transmitted from the engineering system 100 to the apparatus with regard to logical aspects of the data exchange between the network subscribers, generates further configuration data with regard to the physical aspects of the data exchange between the network subscribers, and in particular a target topology 40. For this, expediently, the information from the data sets of the device list 20 with regard to the individual devices A to E and the controller S and especially their interfaces is used.

At runtime, a program section for linking the subscribers S and A to E for generating the target topology 40, while using the above-mentioned functional building blocks as often as needed, looks like the following:

```
/* Adding subscribers S and A to E to target topology */
FB_AddDevice("S");
FB_AddDevice("A");
FB_AddDevice("B");
FB_AddDevice("C");
FB_AddDevice("D");
FB_AddDevice("E");
/* Interconnecting subscriber S with subscriber A */
ErrorCode = FB_AddConnection("S", "1", "A", "1");
If ErrorCode != OK /* reaction in the case of an error */;
/* Interconnecting A with subscriber B */
ErrorCode = FB_AddConnection("A", "2", "B", "1");
If ErrorCode != OK /* reaction in the case of an error */;
/* Interconnecting subscriber A with subscriber C */
ErrorCode = FB_AddConnection("A", "3", "C", "1");
If ErrorCode != OK /* reaction in the case of an error */;
/* Interconnecting subscriber B with subscriber D */
ErrorCode = FB_AddConnection("B", "2", "D", "1");
If ErrorCode != OK /* reaction in the case of an error */;
/* Interconnecting subscriber C with subscriber E */
ErrorCode = FB_AddConnection("C", "3", "E", "1");
If ErrorCode != OK /* reaction in the case of an error */;
/* Interconnecting subscriber D with subscriber E */
ErrorCode = FB_AddConnection("D", "3", "E", "4");
If ErrorCode != OK /* reaction in the case of an error */;
```

In the case of an error, corresponding diagnosis information would be available which can be output, for example, via a machine-man interface such as an operating unit (not illustrated) connected to the apparatus 200.

Expediently, the apparatus 200 is programmed with a further program code 14 so as to check the generated target topology 40 for plausibility in itself. It is in particular checked here if the devices' ports to be interconnected are present, at least according to the device description that can be taken from the device list 20, and are of the same interface type, and if the topology is also otherwise consistent. For the case of an error, corresponding diagnosis information would be available which could be output, for example, via a machine-man interface. Such a program code 14, for example, could look like the following one:

```
/* Checking the target topology */
ErrorCode = ValidateTopology( );
If ErrorCode != OK /* reaction in the case of an error */;
```

Preferably, the apparatus 200 is programmed with a further additional program code 15 so as to check the generated target topology with regard to the present actual topology 300, in particular if the devices to be interconnected according to the target topology 40 are present at all in the actual topology and if the device nature and the device type correspond according to target and actual. In addition, it is preferably checked if the unique device designations as provided according to the device list 20 and the target topology 40 correspond to the ones of the devices A to E in the actual topology 300. For the case of an error, corresponding diagnosis information would be available which, for example, can be output via a machine-man interface.

Since the network according to the actual topology 300 is implemented as PROFINET IRT, the apparatus 200 is advantageously programmed with a further additional program code 17 in such a manner that it offers the functionality of an RTE planning algorithm for calculating RTE communication parameters, in particular with regard to the size of the time slots to be reserved correspondingly for the data transmission, based on the device list 20 and the IO configuration, which is not illustrated in FIG. 2, and the generated target topology 40.

An example for such a program code 17 could look, for example, like the following:

```
/* Start RTE-planning algorithm */
CalculateCommunicationParameters( );
```

The program codes 14, 15 and 17 are illustrated in FIG. 2a as in each case independent configuration program; however, alternatively, this could also involve three program sections of a single configuration program or of the control program 10; this depends in particular also on the question of whether the apparatus 200 is a controller or an apparatus separate from the controller.

Finally, the planned and generated or calculated configuration data are then transmitted (in the figure designated as download) from the apparatus 200 or the controller S to the further subscribers of the network according to the actual topology 300, thus to the devices A to E, each subscriber receiving the subset of configuration data relevant for the respective subscriber. This is carried out, for example, based on the following program code:

```
/* Starting up network and loading generated
   configuration (projecting) on devices */
Activate Configuration( );
```

Upon receipt of the configuration data, the subscribers check automatically if their direct neighbor subscribers according to the actual topology 300 correspond to the planned subscribers and interfaces according to the target topology.

Alternatively or additionally, when providing the at least one configuration-relevant information, the operator has the possibility according to the invention to enable a network topology as a target topology, which network topology is automatically at least partially determined by the apparatus 200 and preferably displayed on the operating unit as so-called online visualization of the plant. In this case, the apparatus 200 is adequately programmed for generating a target topology based on the interconnection information read out from the network and the connected subscribers according to the actual topology, the read out interconnection information preferably comprising unique designations of the devices and their interfaces.

Since an operator is integrated according to the invention in the configuration process in such a manner that he/she has to provide at least one configuration-relevant information, be it in such a manner that said operator, with a view to the desired network topology, simply specifies which device is connected via which port to another one, or that the operator enables a network topology, which is automatically determined by the apparatus 200, as a target topology before the set of configuration data generated by the apparatus 200 is transmitted to the network subscribers and activated, the safety offered by an actual target/actual-comparison is still ensured without the need, however, that for each change in a plant, an engineering system would be required again, wherein in principle any target topologies can be generated by the apparatus 200.

Figure 2B:
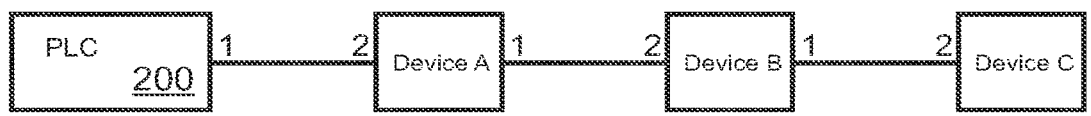
Figure 2C:
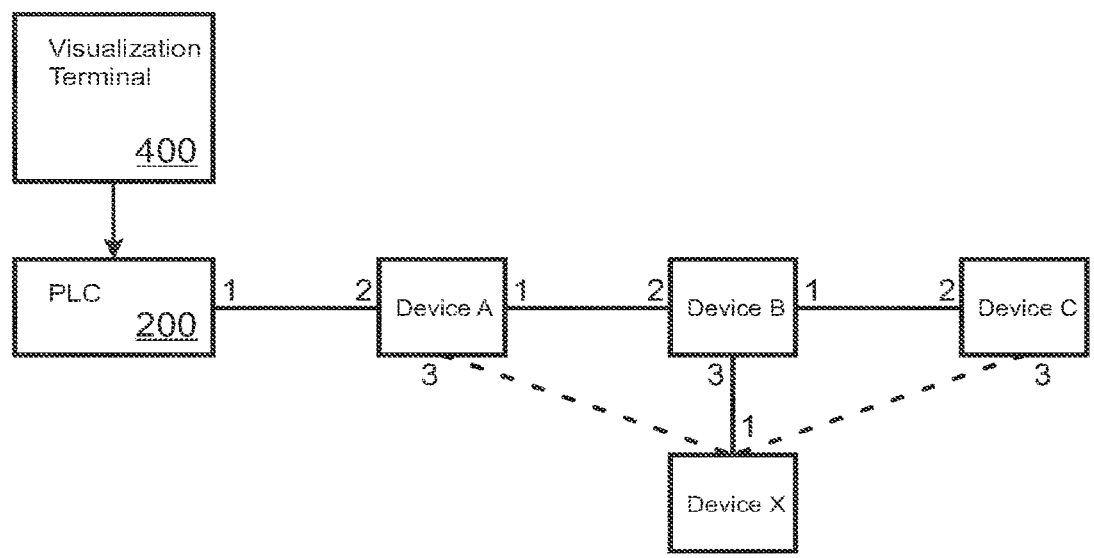

FIGS. 2*b* and 2*c* show an example for the configuration of the devices of a second expanded plant variant (FIG. 2*c*) based on a first basic variant of the plant (FIG. 2*b*) using the embodiment variant of the invention according to FIG. 2*a*.

Apart from a controller 200, a plant according to its basic variant, as shown in FIG. 2*b*, comprises also the devices A, B and C which are connected to each other and thus are subscribers of a joint communication network. The small numbers next to the subscribers represent the unique designation of their respective network interfaces.

Apart from this basic variant, there are further variants according to which the plant, for example, can comprise further devices as optional additional components which are also to be integrated into the network so that for controlling the same, a data exchange at least with the controller 200 is possible. For example, there is a variant in which the plant comprises also a device for material supply which potentially can be connected to the network at different points.

When assembling the plant, the individual devices are installed according to the order of the customer and the conditions on site. In the example as shown in FIG. 2*c*, the device for material supply (device X) is also added and connected via its port 1 to the port 3 of device B. This is indicated by the solid line between the devices X and B, whereas the dashed lines between the device X and the devices A and C indicate the other connection possibilities.

The controller (PLC) 200 according to FIGS. 2*b* and 2*c* is programmed according to the embodiment variant described above and illustrated in FIG. 2*a* so as to be able, on the one hand, to control the devices of all possible variants of the plant, but also, on the other, to generate the configuration data required for configuring the respective devices with regard to physical aspects of the data exchange between the devices and the controller.

Accordingly, apart from the corresponding program code, a device list and the configuration data required for configuring the devices with regard to logical aspects of the data exchange and in particular the IO allocation and the IO configuration, as already described above in connection with FIG. 2, are already available on the controller 200, although this is not explicitly illustrated in the FIGS. 2*b* and 2*c*.

In order to be able to configure the devices of the plant variant illustrated in FIG. 2*c* also with regard to physical aspects of the data exchange, the controller 200 needs only the input of at least one configuration-relevant information by the operator. For this, the latter can use the visualization terminal 400 connected to the controller 200 as an operating unit in order to enter that now, in addition to the basic variant, the device X is connected via its port 1 to the port 3 of the device B. In doing so, the operator can use the information from the data sets of the device list and therefore preferably only needs to select the corresponding devices and network interfaces.

The corresponding program section for the subsequent processing of the configuration-relevant information provided by the operator and the generation of a corresponding target topology could look at runtime, for example, like the following:

```
FB_AddDevice("PLC");
FB_AddDevice("A");
FB_AddDevice("B");
FB_AddDevice("C");
FB_AddDevice("X");
FB_AddConnection("PLC", "1", "A", "2");
FB_AddConnection("A", "1", "B", "2");
FB_AddConnection("B", "1", "C", "2");
FB_AddConnection("B", "3", "X", "1");
```

Furthermore, a plausibility check of the generated target topology takes place on the controller 200. Moreover, a check of the target topology against the present actual topology takes place. For the case of an error, the in each case adequate diagnosis information would be available which, for example, can be output via the visualization terminal 400 connected to the controller 200.

Furthermore, the necessary RTE communication parameters, for example, transmitting and receiving times of data telegrams are calculated.

Finally, the planned and generated or calculated configuration data is transmitted from the controller 200 to the further subscribers of the network, thus to the devices A, B, C and X, each subscriber receiving the subset of configuration data that is relevant for the respective subscriber.

After this, the operation of the plant in the expanded variant according to FIG. 2*c* can be activated.

Figure 3A:
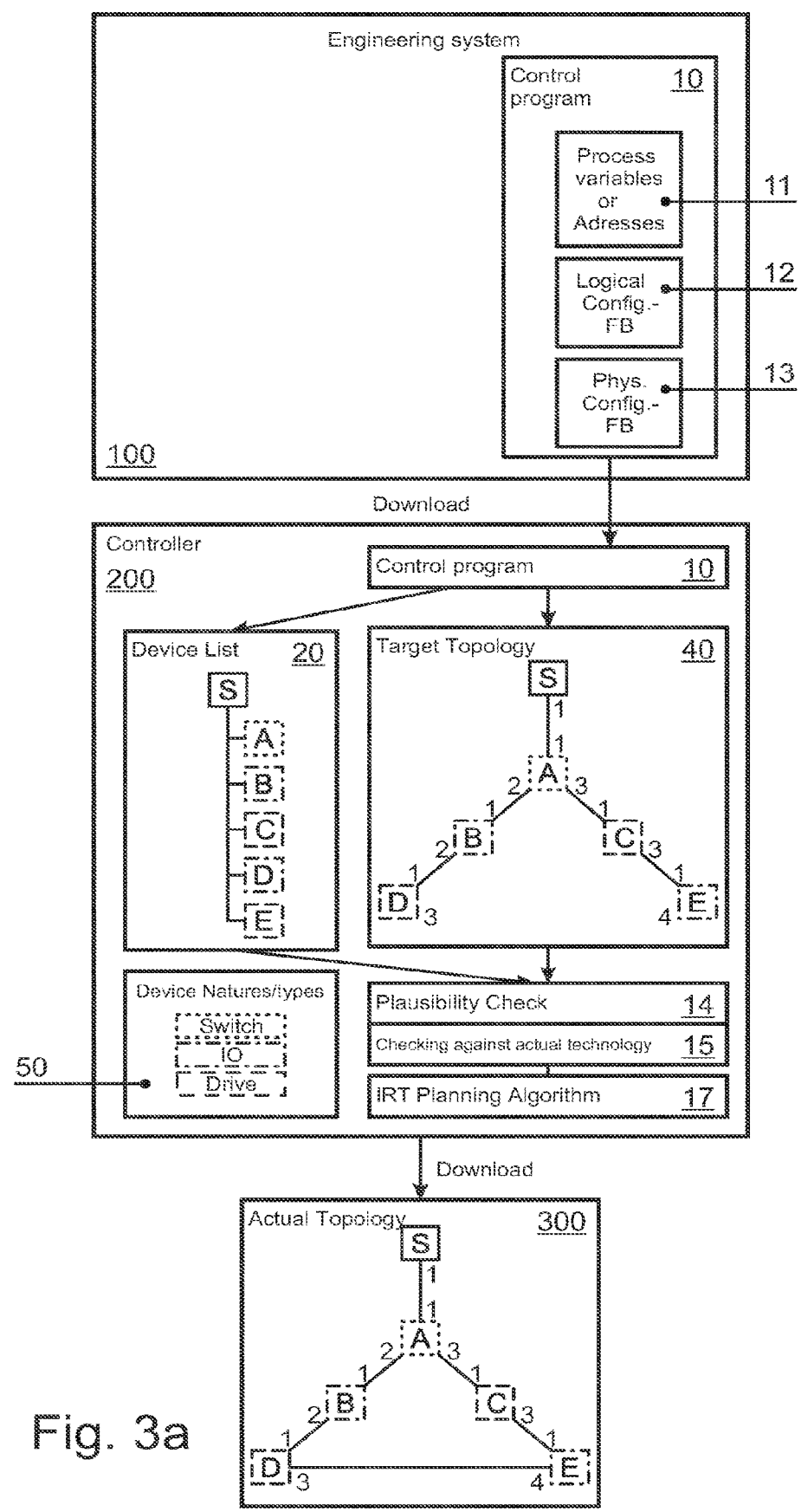
FIG. 3a shows a schematic illustration of a further illustration of an embodiment variant according to the invention for configuring subscribers of a network.

FIG. 3*a* is a schematic illustration of another embodiment variant according to the invention for configuring subscribers of a network which are in particular devices of an industrial automation plant.

The network subscribers to be configured involve here the devices A, B, C, D and E as well as the control S which belong to a certain variant of an industrial plant, which is not shown in more detail in FIG. 3, and which are connected via a network according to an actual topology 300 which, in this case, is implemented again as PROFINET IRT so that the communication between the network subscribers takes place or shall take place in a cyclic, real-time-bound and clock-synchronous manner. The small numbers next to the subscribers represent the unique designation of their respective network interfaces.

Within the planning or projecting of a plant preferably having at least one controller and a number of devices which, as subscribers of a network, are in communication per data exchange, according to this embodiment variant, an engineering system 100 is substantially only used for designing or preparing a scheduler or a controlling program 10 by means of which a control unit such as the controller S can be programmed in order to control devices such as the devices A to E during the operation of the plant. For this purpose, the control program 10 comprises suitable program codes for at least each of the devices A to E, in particular also already for further devices or device types or device natures which would be used for variants of the plant other than the one according to FIG. 3*a*.

From the following detailed description of this embodiment variant according to the invention, the differences with respect to the embodiment variant described above by means of the FIGS. 2a to 2c and the additional advantages resulting therefrom are apparent.

According to this further embodiment variant according to the invention, in addition to the physical configuration, the logical configuration too is not carried out anymore by means of the engineering system 100. Rather, it is provided instead to develop or prepare a configuration system, preferably by means of the engineering system 100, which comprises a program code by means of which an apparatus 200 can be programmed so as to configure network subscribers, such as the devices A to E, with regard to logical as well as physical aspects of the data exchange via the network and for this, in response to at least one configuration-relevant information provided by an operator, to generate a set of required configuration data and to transmit at least a subset of the generated configuration data via the network to a subscriber to be configured. Here, the apparatus 200 can generate a device list 20 and also, with respect to the configuration regarding logical aspects, corresponding configuration data which in particular define the IO allocations and IO configurations.

As is apparent from FIG. 3a, in this example too, the apparatus 200 is a controller so that here the apparatus 200 is, at the same time, also the controller S. For this reason, the control program 10 prepared by means of the engineering system 100 also comprises, apart from a set of program codes for the device control with corresponding process variables and/or addresses 11, an additional program section 13 which, preferably by integrating at least one functional building block, contains program codes for the physical configuration of devices or network subscribers, as well as a further additional program section 12 which, preferably by integrating at least one functional building block, contains program codes for the logical configuration of devices or network subscribers. However, such functional building blocks or similar or other mechanisms can also be integrated in an independent configuration program, especially if the apparatus 200 is implemented separately from the controller S which, according to the invention, can also be provided for specific applications.

According to the invention, in this embodiment variant, the transmission of the configuration data, including the device list 20 and the control program 10 together with the program sections 12 and 13, can already take place (in the figure designated as download) to the apparatus 200, which in this case, is, at the same time, the controller S, wherein the engineering system 100 is at least temporarily connected to the apparatus 200.

As is apparent from FIG. 3a, on the apparatus 200, there is a device catalog 50 (repository) with entries for device types which are preferably divided into device natures such as switch, IO or drive, wherein for each device type, a set of further description data such as, for example, the name of the manufacturer is already available. Such a device catalog 50 can preferably also be prepared by means of an engineering system 100 and subsequently be transmitted to the apparatus 200.

A functional building block for adding a data set for a certain device to the device list using the description data about the device type of this device stored in the device catalog could look, for example, like the following:

```
FB_CreateLogDevice(IN: DeviceID, DeviceNature,
    DeviceType, VendorID) return
    ErrorCode
```

A functional building block for establishing an IO allocation between a variable 11 of the control program 10 and a process data address of a device that is included in the device list 20, could look, for example, like the following:

```
FB_CreateIOConnection(IN: VariableName, Devi-
    ceID, Adress)
```

When executing the control program, preferably, first the program section 12 and thus the program code for the logical configuration of the network subscribers is executed.

Through an operating unit, which is not illustrated in the figure, an operator has now the possibility to provide in a simple manner configuration-relevant information and, with a view to the desired network topology, to provide in particular which devices are included therein, so that a device list 20 with corresponding device data sets can be generated. In doing so, the operator can use the information from the entries in the device catalog 50 and therefore preferably only needs to select the adequate device types and provide unique device names.

In response to said information, the apparatus 200 or the controller S generates the corresponding device list 20. For this purpose, preferably, the information contained in the device catalog 50 with regard to the device types and further data of the individual devices A to E and the controller S and especially their network interfaces are used.

A program section for generating the device list 20 using the device catalog 50 for adding a data set for the device "A" of the device nature "switch", the device type "type 1" and the manufacturer "H1" as well as a data set for the device "B" of the device nature "IO", the device type "type 11" and the manufacturer "H2" at runtime would look, for example, like the following, wherein the above-mentioned functional building blocks are used as often as required:

```
/* Adding devices to the device list */
FB_CreateLogDevice("A", "Switch", "Type 1", "H1");
FB_CreateLogDevice("B", "IO", "Type 11", "H2");
```

The program code for the further devices C to E of the actual topology 300 would look similar.

Through the operating unit, which is not illustrated in the figure, the operator also has the possibility to provide configuration-relevant information with respect to the TO allocation.

A program section for generating corresponding links between a variable 11 of the control program 10 and a process data address of a device which is now included in the device list 20 could look at runtime, for example, like the following, wherein the above-mentioned functional building blocks are used as often as required:

```
/* IO allocation */
FB_CreateIOConnection("Variable1", "A", "Address 10.4");
FB_CreateIOConnection("Variable2", "B", "Address 6.4");
```

The program code for the further devices C to E of the actual topology 300 would look similar.

A program section for generating further configuration data, in particular with regards to the IO configuration, in response to corresponding information from the operator, for example regarding parameters such as update times or timeouts for individual devices, can also be provided.

If there is no suitable entry for a device in the device list 50, it is also possible that all required data or parameters are provided by the operator by means of the operating unit, wherein they could also be deposited for a later use in the device catalog 50, or that alternatively, an expanded device catalog 50 can be loaded on the apparatus 200.

It is also conceivable that information about a device, if the information is not available in the device catalog, is read out from the respective device by the apparatus 200 when the device is already connected to the apparatus 200.

Preferably, following the configuration of the logical elements or aspects, the configuration with regard to the physical aspects can take place, wherein for this purpose, the program section 13 and therefore the program code for the physical configuration of the network subscribers is executed.

During the generation of the physical configuration data, which substantially takes place in a manner already described above for the first embodiment variant, the device list 20, which is now available, can be used.

FIG. 3a further shows that the apparatus 200 is preferably also programmed with a further program code 14 for the plausibility check of the generated target topology 40, with program code 15 for checking the target topology 40 with regard to the present actual topology 300, and with program code 17 for calculating RTE communication parameters, wherein in this respect, reference is made again to the explanations above regarding the first embodiment variant.

Finally, according to embodiment variant as shown in FIG. 3a, the planned and generated or calculated configuration data are transmitted from the apparatus 200 or the controller S to the further subscribers of the network according to the actual topology 300, thus to the devices A to E (in the figure designated as download), each subscriber receiving the subset of configuration data that is relevant for the respective subscriber.

Preferably, the apparatus 200 is programmed with a further additional program code, which is not illustrated in the figure, in such a manner that the apparatus offers the functionality to assign device names and/or other device identifications, as provided according to the target topology 40 and the device list 20, to the devices A to E of the actual topology 300 (so-called device naming) so that during the subsequent operation of the plant and the network, a unique identification of the devices is ensured, wherein the devices "to be named" of the actual topology are first identified by the apparatus 200 or the controller S based on the neighbor devices connected in each case to said devices to be named, and optionally based on the respective device nature and/or device type. In the case of an error, thus, for example, if a device in the actual topology cannot be identified, corresponding diagnosis information is available which then effects a corresponding reaction.

Figure 3B:
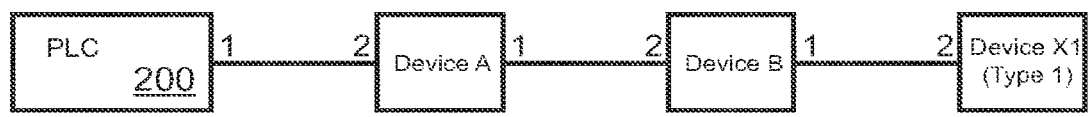
FIGS. 3b and 3c show a schematic illustration of an example for the configuration of devices of a plant using the embodiment variant of the invention according to FIG. 3a after a device of a first type (FIG. 3b) has been replaced by a device of a second type (FIG. 3c)
Figure 3C:
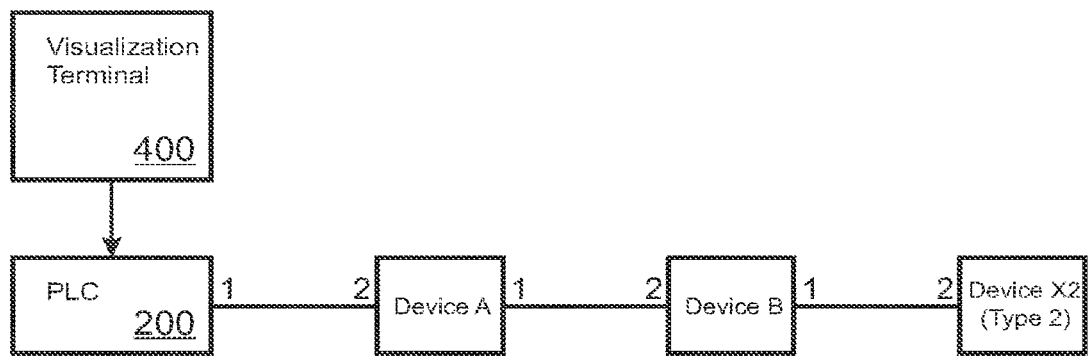

FIGS. 3b and 3c show an example for the configuration of the devices of a plant using the embodiment variant of the invention according to FIG. 3a, after a device of a first type (FIG. 3b) has been replaced by a device of the second type (FIG. 3c).

A machine or plant can comprise a multiplicity of devices which are connected to each other. The example is based on the operation of a wind power plant in which, apart from a controller 200 (PLC) and the devices A and B, a frequency converter of the type 1 is also used, which is illustrated in FIG. 3b as device X1, the devices A, B, X1 and the controller 200 being connected to each other and thus being subscribers of a joint communication network. The small numbers next to the subscribers represent the unique designation of the subscribers' respective network interface.

If a component fails, it is not always possible to replace it with an identical component. Since machines and plants are often in operation over many decades, it is not possible to know at the moment of the plant installation which replacement components will be used in the future. For example, after a failure of the frequency converter of the type 1, the said frequency converter is to be replaced by a frequency converter of the type 2 as shown in FIG. 3c which principally fulfils the same function, but has a different identification, in particular a different device name, is a different device type and made by a different manufacturer, and has a different sequence of process data. However, according to the invention, the configuration and integration of this replacement component of a different type is possible in a simple and secure manner.

The controller (PLC) 200 according to FIGS. 3b and 3c is programmed according to the embodiment variant described above and illustrated in FIG. 3a in order to be able, on the one hand, to control the devices of all possible variants of the plant, but also to be able to generate the configuration data which are required for configuring the respective devices with regard to logical as well as physical aspects of the data exchange between the devices and the control.

Accordingly, apart from the corresponding program code, without being explicitly illustrated in the FIGS. 3b and 3c, there is already a device catalog on the controller 200, as already described above in connection with FIG. 3a.

In order to be able to configure the devices of the plant illustrated in FIG. 3c, and in particular the device X, with regard to logical aspects of the data exchange, the controller 200 needs the input of configuration-relevant information by the operator. For this, the latter can use the visualization terminal 400 connected to the controller 200 as an operating unit in order to indicate that the device X2 is now located in the plant, wherein the operator can use the description data included in the device catalog for the device type of the device X2 and thus preferably only needs to provide the unique device name in order that a device data set for the device X2 generated by the controller 200 in response to this information can be inserted into the device list.

The corresponding program section for generating and adding a device data set for the device "X2", the device nature "frequency converter", the device type "type 2" and the manufacturer "HS 23" with an update time of "1 ms" could look at run time like the following:

FB_CreateLogDevice("X2", "frequency converter", "type 2", "HS 23", "1 ms");

Furthermore, the operator can use the visualization terminal 400 connected to the controller 200 to provide information with regard to the IO allocation since the device X2 has a different wiring for the process or IO data.

A program section for generating corresponding links between a variable "target speed" of the control program 10 and a process data address of the device X2, which is now included in the device list, could look at runtime, for example, like the following:

FB_CreateIOConnection("target speed", "X2", "address 8.2");

In order to be able to configure the devices of the plant illustrated in FIG. 3c also with regard to physical aspects of the data exchange, the controller 200 only needs to be informed that now instead of the device X1, the device X2 is connected with its port 2 to the port 1 of the device B. For this, on the one hand, the visualization terminal 400 and, on the other, the information from the data sets of the device list can be used so that the operator preferably only needs to select the corresponding devices and network interfaces.

The corresponding program section for subsequently processing the configuration-relevant information provided by the operator and the generation of a corresponding target topology could look at runtime like the following:

```
FB_AddDevice("PLC");
FB_AddDevice("A");
FB_AddDevice("B");
FB_AddDevice("X2");
FB_AddConnection("PLC", "1", "A", "2");
FB_AddConnection("A", "1", "B", "2");
FB_AddConnection("B", "1", "X2", "2");
```

Furthermore, a plausibility check of the generated target topology is carried out on the controller 200. In addition, a check of the target topology against the present actual topology is carried out. For the case of an error, corresponding diagnosis information would be available in each case which, for example, can be output via the visualization terminal 400 connected to the controller 200.

Furthermore, the necessary RTE communication parameters, for example transmitting and receiving times of data telegrams, are calculated by the controller 200.

Finally, the planned and generated or calculated configuration data are transmitted from the controller 200 to the further subscribers of the network, thus to the devices A, B and X2, each subscriber receiving the subset of configuration data relevant for the respective subscriber.

Subsequently, the operation of the plant with the devices according to FIG. 3c can be activated.

Figure 4:
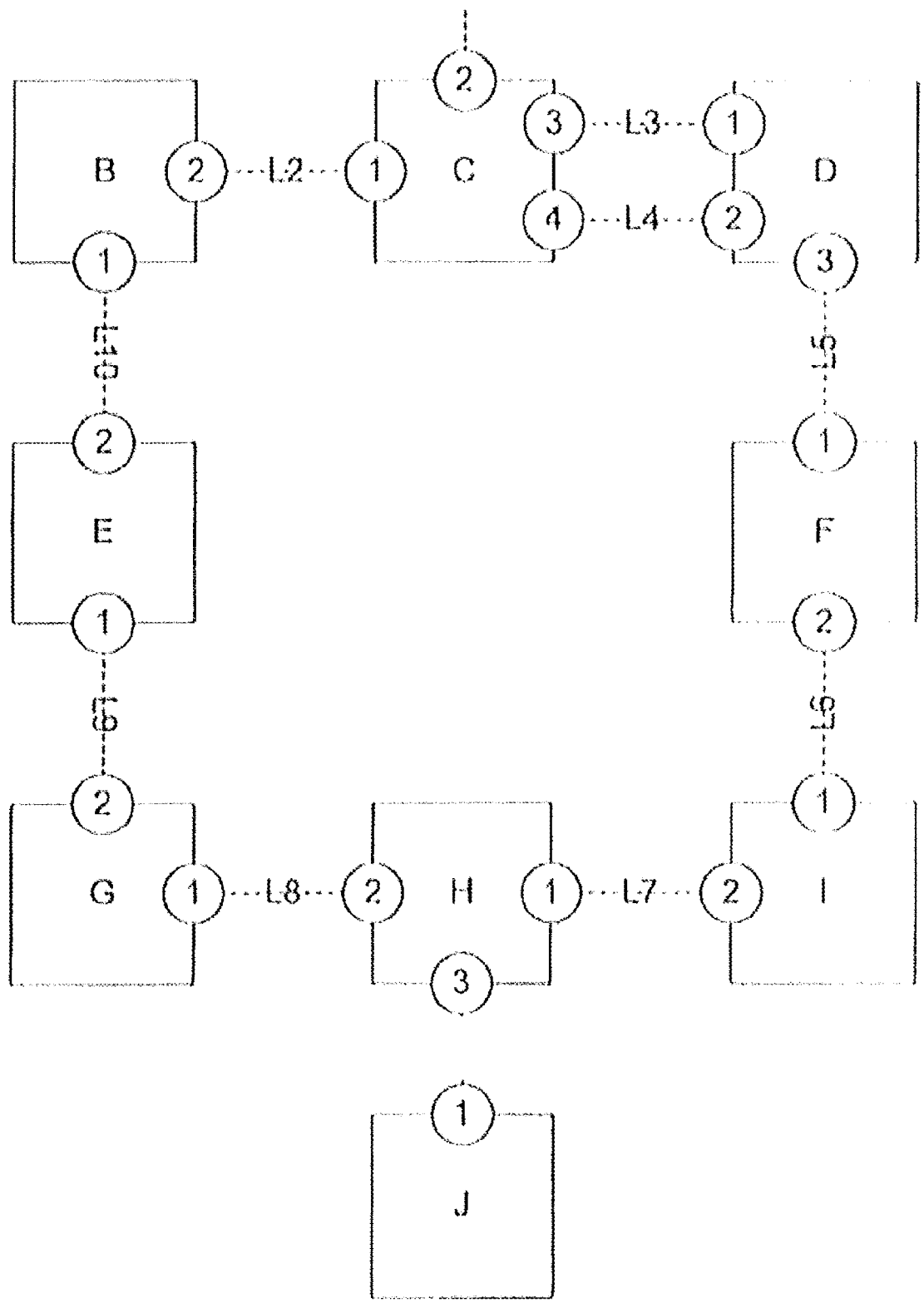
FIG. 4 shows a schematic illustration of a ring-topological network

FIG. 4 finally shows the topological structure of a network structure according to the invention. Here, the network subscribers A to J are arranged according to the target specification from the engineering system; for example, the network subscribers A to I in FIG. 4 are arranged in a ring topology structure. The lengths of the lines L1 to L11 are preferably predefined and, for the purpose of time synchronization, are stored in the respective adjacent network subscribers. Between two network subscribers there can be one network line as shown, for example, between the network subscribers B and C via L2; however, it is also possible to connect a plurality of network connection lines, as shown in FIG. 4, between the network subscribers C and D via the lines L3 and L4.

According to the invention, the network subscribers, for example the subscribers A to J in FIG. 4, are provided with an equipment which allows that each device itself compares the planned (target) neighbor devices specified by the engineering system and the (target) network interfaces possibly also specified by the engineering system with the neighbor devices present and in use (actual) and the corresponding (actual) network interfaces. The equipment now compares the present (target) neighbor devices with the (target) neighbor devices specified in the engineering system. With the equipment according to the invention, a start or operation of the network is possible even if the installed (actual) neighbor devices are not connected to the potentially specified (target) network interfaces of the network subscribers. However, an operation of the network is prevented if the (target) neighbor devices are not identical to the installed (actual) neighbor devices.

For using and/or installing the equipment according to the invention in a conventional network which, for example, is built up according to the PROFInet-IRT standard, neither the PROFInet standard has to be expanded, nor do the engineering systems have to be changed. Handling during the installation or during maintenance and device replacement is therefore simplified by the equipment according to the invention.

When planning a target topology of networks to be newly built up, moreover, an exact target arrangement of the network interfaces can be already dispensed with in the engineering system. It is only documented which devices will be connected with corresponding neighbor devices; for example, in the exemplary arrangement according to FIG. 4, the devices E and H are predefined as neighbor devices of device G. Preferably, the line lengths of the connection lines L8 and L9 are also specified, only the connection by means of the network interfaces 1 or 2 of the network subscriber G is not determined. Thus, the network subscriber E will not disturb the operation of the network when being connected to the interface 1, although said subscriber might be planned for the interface 2. As in the case of the network subscribers C and D, it is also possible to specify a number of line connections between the network subscribers; however, it does not matter if the line L4 for example at the network subscriber C is connected via one of the interfaces 1 to 4 to the device D. It is also conceivable that the line 3 extending from the interface 2 or 3 of the network subscriber D is connected to one of the network interfaces 1 to 4 of the network subscriber C. The freedom according to the invention of the interface selection therefore significantly simplifies the handling during the installation or during maintenance and device replacement with respect to a conventional connection according to the PROFInet-IRT standard.

It is obvious for the person skilled in the art that the above-described embodiments are to be understood as examples and the invention is not limited thereto, but can be varied in many different ways without departing from the invention. Furthermore, it is apparent that the features, irrespective of whether they are disclosed in the description, the claims, the figures or otherwise, can also individually define integral parts of the invention, even if they are jointly described together with other features.

What is claimed is:

1. A topologically planned real time network for use in industrial networks for transmitting time-critical data in automation plants comprising at least a first and a second network subscriber, each having at least one network interface for connecting to the topologically planned real time network, wherein for the first and for the second network subscriber a target configuration of a respective neighborhood is defined with respect to the first and the second network subscriber, wherein the first and the second network subscriber check automatically a physical actual configuration of a network interface connection on the basis of the target configuration, wherein by said check of the physical actual configuration of the network interface connection, with the check being based on the target configuration of a network topology and the neighborhood being in correspondency, the network interface and/or the connection is activated, if a correspondency of the neighborhood is determined, wherein said check of the physical actual configuration is reduced to the neighborhood, while a predefined network interface match is not necessary anymore, and wherein said check of the physical actual configuration can be securely checked by at least one of the first and the second network subscribers.

2. The topologically planned real time network according to claim 1, wherein a check of the physical actual configuration of the network interface connection, with the check being based on the target configuration of the network topology and the neighborhood being in correspondency, determines an application of the communication parameters to the at least one network interface of the first network subscriber.

3. The topologically planned real time network according to claim 1, further comprising means for configuring, according to a target state, the first network subscriber with regard to a data exchange via the topologically planned real time network, wherein the first subscriber is connected via the topologically planned real time network to an apparatus which is programmed in such a manner that the apparatus, in response to at least one configuration-relevant information provided by an operator, generates a set of configuration data required for configuring at least the first subscriber, and transmits at least a subset of this generated set of configuration data via the topologically planned real time network to the first subscriber.

4. The topologically planned real time network according to claim 3, further comprising the apparatus, which has means for data processing and for executing program codes as well as means for a data exchange with the second subscriber to which the apparatus can be connected via the topologically planned real time network,
  wherein the apparatus is programmed so as to configure, according to a target state, the second subscriber with regard to the data exchange via the topologically planned real time network, and
  wherein the apparatus, in response to at least one configuration-relevant information provided by an operator, generates a set of configuration data required for configuring the second subscriber and transmits at least a subset of this generated set of configuration data via the topologically planned real time network to the second subscriber.

5. The topologically planned real time network according to claim 4, wherein the at least one configuration-relevant information can be provided by the operator using a man-machine interface allocated to the apparatus.

6. The topologically planned real time network according to claim 4, wherein the apparatus is programmed so as to configure the second subscriber with regard to logical and/or physical aspects of the data exchange via the topologically planned real time network.

7. The topologically planned real time network according to claim 6, wherein the set of configuration data generated and required for configuring the second subscriber with regard to physical aspects comprises a target topology for the topologically planned real time network.

8. The topologically planned real time network according to claim 4, wherein the means for the data exchange are formed for a cyclical data exchange via the topologically planned real time network.

9. The topologically planned real time network according to claim 4, wherein the means for the data exchange are formed for a real-time-bound data exchange via the topologically planned real time network and the apparatus is programmed so as to configure the second subscriber with regard to a real-time-bound data exchange via the topologically planned real time network.

10. The topologically planned real time network according to claim 4, wherein the means for data exchange are formed for a clock-synchronous data exchange via the topologically planned real time network and the apparatus is programmed so as to configure the second subscriber with regard to a clock-synchronous data exchange via the topologically planned real time network.

11. The topologically planned real time network according to claim 4, wherein the means for the data exchange are formed for a data exchange via the topologically planned real time network according to a Profinet Isochronous Real Time (IRT) specification.

12. The topologically planned real time network according to claim 11, wherein the set of configuration data generated and required for configuring the second subscriber comprises a set of RealTime Ethernet-specific (RTE-specific) parameters calculated by the apparatus.

13. The topologically planned real time network according to claim 12, wherein the apparatus reads out a set of configuration-relevant information from the topologically planned real time network and/or the second subscriber and, based thereon, generates the set of configuration data required for configuring the second subscriber, and in response to at least one configuration-relevant information provided by the operator, transmits a release of the generated set of configuration, at least a subset of this generated set of configuration data, via the topologically planned real time network to the second subscriber.

14. The topologically planned real time network according to claim 12, wherein the apparatus first checks the set of configuration data generated and required for configuring at least the second subscriber for plausibility in itself before the apparatus transmits at least a subset of this generated set of configuration data via the topologically planned real time network to the second subscriber.

15. The topologically planned real time network according to claim 12, wherein the apparatus first checks the set of configuration data generated and required for configuring at least the second subscriber for plausibility with regard to the actual state of the topologically planned real time network and at least of the second subscriber before the apparatus transmits at least a subset of this generated set of configuration data via the topologically planned real time network to the second subscriber.

16. The topologically planned real time network according to claim 12, wherein the apparatus is programmed so as to configure itself, with regard to the data exchange via the topologically planned real time network, by means of at least a subset of the generated set of configuration data.

17. The topologically planned real time network according to claim 12, wherein the apparatus is programmed so as to control the second subscriber after the configuration, and wherein the apparatus is a programmable logic controller.

18. A non-transitory data carrier comprising program code stored thereon,
  wherein the program code stored on the non-transitory data carrier comprises:
  i) a subscriber or device list for at least the first and the second network subscribers, wherein the list contains data sets for the corresponding network subscriber, and wherein each device data set comprises a set of information which describes the respective device,
  ii) functional building blocks for adding and connecting network subscribers, and
  iii) program code of a configuration program for configuration of the first and the second network subscribers so that the apparatus according to claim 3 is formed when the apparatus is programmed with the program code.

* * * * *